United States Patent
Takehana et al.

(10) Patent No.: US 12,343,922 B2
(45) Date of Patent: Jul. 1, 2025

(54) DIE UNIT, BLOW MOLDING DEVICE, AND BLOW MOLDING METHOD

(71) Applicant: NISSEI ASB MACHINE CO., LTD., Nagano (JP)

(72) Inventors: Daizaburo Takehana, Nagano (JP); Toshiteru Oike, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 749 days.

(21) Appl. No.: 17/633,019

(22) PCT Filed: Aug. 6, 2020

(86) PCT No.: PCT/JP2020/030211
§ 371 (c)(1),
(2) Date: May 17, 2022

(87) PCT Pub. No.: WO2021/025121
PCT Pub. Date: Feb. 11, 2021

(65) Prior Publication Data
US 2022/0274311 A1 Sep. 1, 2022

(30) Foreign Application Priority Data
Aug. 8, 2019 (JP) .................... 2019-145943
Aug. 8, 2019 (JP) .................... 2019-146145

(51) Int. Cl.
*B29C 49/00* (2006.01)
*B29C 49/06* (2006.01)
(Continued)

(52) U.S. Cl.
CPC ............ *B29C 49/643* (2022.05); *B29C 49/06* (2013.01); *B29C 49/6465* (2022.05); *B29L 2031/712* (2013.01)

(58) Field of Classification Search
CPC .......... B29C 49/643; B29C 49/6458; B29C 49/6465; B29C 49/6466
See application file for complete search history.

(56) References Cited

U.S. PATENT DOCUMENTS 5,385,466 A 1/1995 Konefal
5,498,150 A * 3/1996 Check .................. B29C 33/04
264/528
(Continued)

FOREIGN PATENT DOCUMENTS

CN 1111563 A 11/1995
CN 205522405 U 8/2016
(Continued)

OTHER PUBLICATIONS

Mechanical translation of JP-3255485-B2 dated Nov. 2001. (Year: 2001).*
(Continued)

*Primary Examiner* — Thu Khanh T. Nguyen
(74) *Attorney, Agent, or Firm* — GREENBLUM & BERNSTEIN, P.L.C.

(57) ABSTRACT

There is provided a mold unit for cooling a preform that has been injection-molded, the preform having a bottomed shape and made of a resin, the mold unit including a core mold having an outer shape corresponding to an inner shape of the preform, and being insertable into the preform, in which a flow path for a temperature adjustment medium extending in an axial direction of the core mold is formed inside the core mold, the flow path is formed at a position displaced in a circumferential direction of the core mold, and a position of the flow path is adjustable in the circumferential direction.

8 Claims, 13 Drawing Sheets

(51) Int. Cl.
   *B29C 49/64*   (2006.01)
   *B29L 31/00*   (2006.01)

(56) References Cited

U.S. PATENT DOCUMENTS

| | | | |
|---|---|---|---|
| 10,144,168 | B2 | 12/2018 | Nakahara |
| 2003/0205841 | A1* | 11/2003 | Neter ................ B29C 45/7207 264/237 |
| 2019/0337218 | A1 | 11/2019 | Kawamura et al. |
| 2022/0055279 | A1* | 2/2022 | Oike ...................... B29C 49/64 |

FOREIGN PATENT DOCUMENTS

| | | | |
|---|---|---|---|
| JP | 46-26292 | Y | 9/1971 |
| JP | 54-50061 | U1 | 9/1979 |
| JP | 4-49023 | A | 2/1992 |
| JP | 5-41761 | U1 | 6/1993 |
| JP | 6-278196 | A | 10/1994 |
| JP | 3255485 | B2 * | 2/2002 ......... B29C 45/7312 |
| JP | 6230173 | B2 | 11/2017 |
| JP | 6505344 | B1 | 4/2019 |

OTHER PUBLICATIONS

International Search Report and Written Opinion of the International Searching Authority issued in International Patent Application No. PCT/JP2020/030211, dated Oct. 27, 2020, along with an English translation thereof.

Office Action issued Apr. 25, 2023 in Chinese family member application No. 202080057043.7. Note: This document is submitted for its characterization of the references cited therein as "X", "Y", "A", etc., and the Examiner's consideration of at least this portion of the document (see p. 8, which includes English characters) on this basis.

* cited by examiner (B)

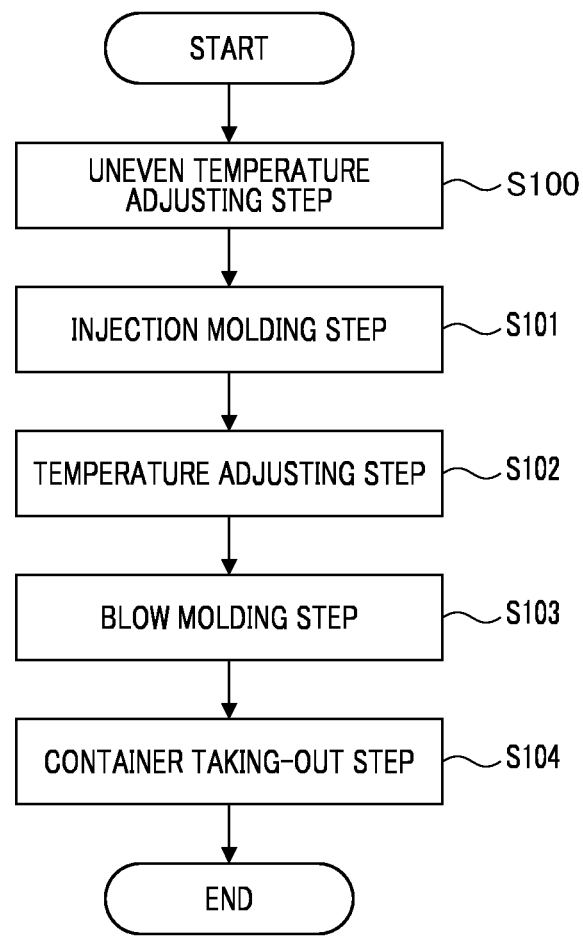

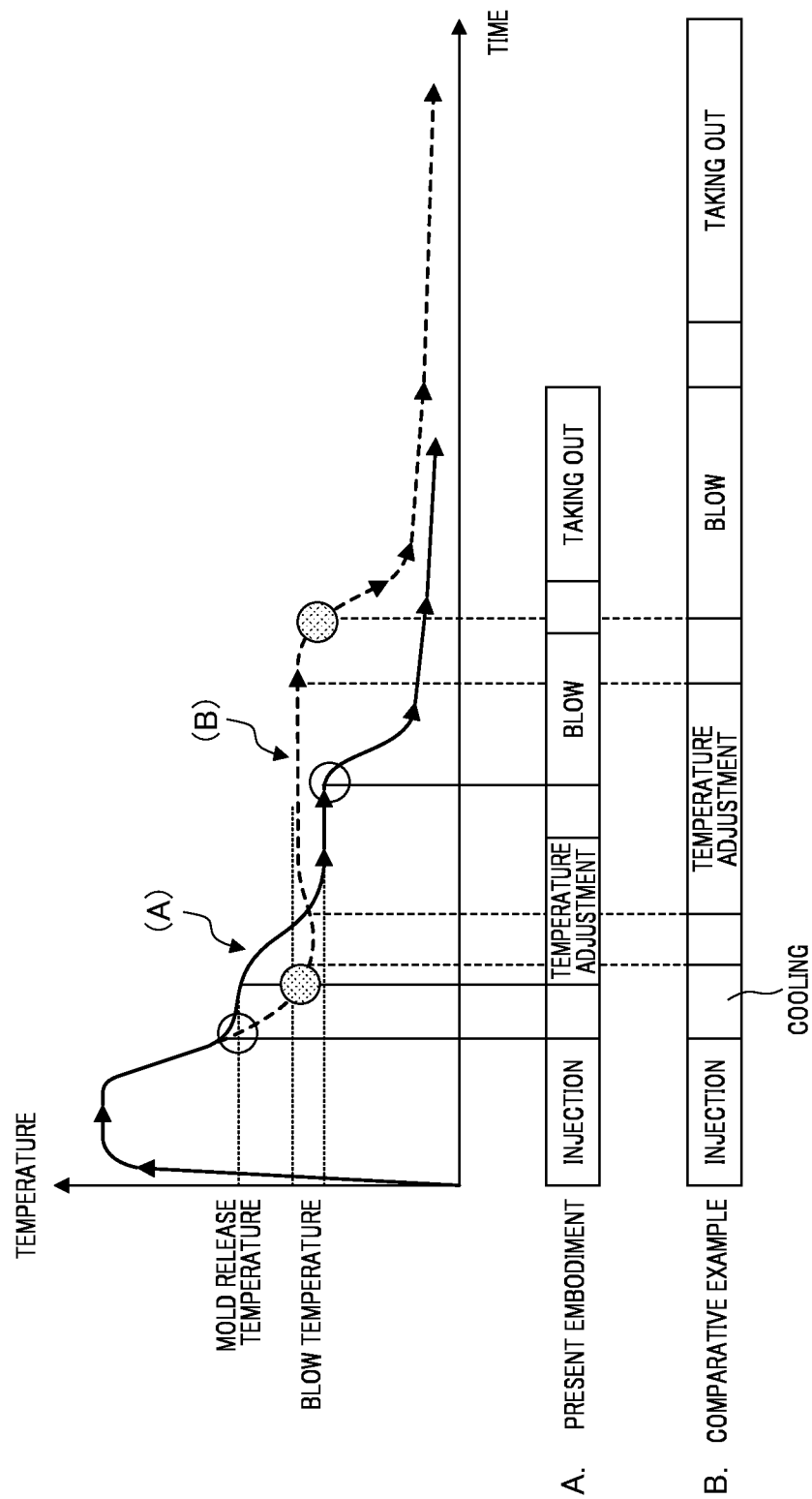

DIE UNIT, BLOW MOLDING DEVICE, AND BLOW MOLDING METHOD

BACKGROUND OF THE INVENTION

Field of the Invention

The present invention relates to a mold unit, a blow molding apparatus, and a blow molding method.

Description of the Related Art

A hot parison type blow molding apparatus has been conventionally known as one of apparatuses for manufacturing a resin container. The hot parison type blow molding apparatus is configured to blow-mold a resin container using residual heat generated in injection molding of a preform, and is advantageous in that it is possible to manufacture resin containers with varieties and excellence in aesthetic appearance as compared with a cold parison type.

For example, various proposals have been made regarding a hot parison type blow molding cycle and an injection molding cycle of a preform for the purpose of shortening the molding cycle. In order to shorten these molding cycles, it has been proposed to shorten the injection molding time of the preform, which is a rate-determining stage (cooling time of the preform in the injection mold), and to additionally cool the preform in a high temperature state in a downstream step after the injection molding (see, for example, JP 6505344 B1).

There has also been proposed a configuration in which a preform is brought into contact with a cavity mold and a core mold to cool the preform through heat exchange with the molds, and the uneven temperature of the preform is adjusted (see, for example, JP 6230173 B2).

Due to the influence of shear heat generated in an injection molding apparatus or a hot runner, slight misalignment in injection molding molds (an injection core mold and an injection cavity mold), and the like, a preform after injection molding generally has temperature unevenness (uneven temperature) in the circumferential direction derived from the injection molding.

When a preform that is large in uneven temperature in the circumferential direction is blow-molded, variations in thickness distribution and appearance of a container to be manufactured increase due to a difference in residual heat in the circumferential direction of the preform, and adversely affect the quality of the container.

SUMMARY OF THE INVENTION

One aspect of the present invention is a mold unit for cooling a preform that has been injection-molded, the preform having a bottomed shape and made of a resin, the mold unit including a core mold having an outer shape corresponding to an inner shape of the preform, and being insertable into the preform, in which a flow path for a temperature adjustment medium extending in an axial direction of the core mold is formed inside the core mold, the flow path is formed at a position displaced in a circumferential direction of the core mold, and a position of the flow path is adjustable in the circumferential direction.

Another aspect of the present invention is a mold unit for cooling a preform that has been injection-molded, the preform having a bottomed shape and made of a resin, the mold unit including a core mold having an outer shape corresponding to an inner shape of the preform, and being insertable into the preform, in which an exhaust port is disposed at a tip end portion of the core mold facing a bottom portion of the preform, the exhaust port being configured to discharge air from an inside of the preform through an inside of the core mold, a plurality of flow paths for a temperature adjustment medium extending in an axial direction of the core mold are formed inside the core mold, and the flow paths for the temperature adjustment medium are arranged in parallel with each other along a circumferential direction of the core mold.

Further features of the present invention will become apparent from the following description of exemplary embodiments with reference to the attached drawings.

BRIEF DESCRIPTION OF THE DRAWINGS

FIG. 6 is a flowchart illustrating steps of a blow molding method.

FIG. 7 is a graph illustrating an example of temperature changes of a preform in the blow molding method in the present embodiment and a comparative example.

DESCRIPTION OF THE EMBODIMENTS

Figure 1:
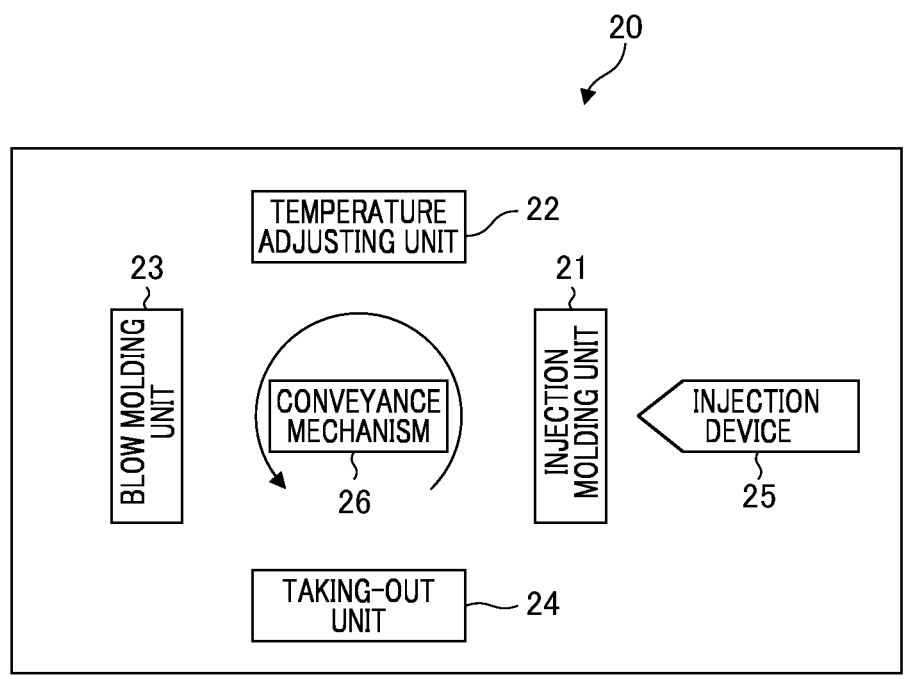
FIG. 1 is a diagram schematically illustrating a configuration of a blow molding apparatus in a first embodiment.

Hereinafter, embodiments of the present invention will be described with reference to the drawings.

In the embodiments, in order to facilitate understanding, structures and elements other than the main parts of the present invention will be described in a simplified or omitted manner. In addition, in the drawings, the same elements are denoted by the same reference numerals. Note that the shapes, dimensions, and the like of the respective elements illustrated in the drawings are schematically illustrated, and do not indicate actual shapes, dimensions, or the like.

First Embodiment

FIG. 1 is a diagram schematically illustrating a configuration of a blow molding apparatus 20 in a first embodiment. The blow molding apparatus 20 in the present embodiment is a hot parison type (also referred to as a single-stage type) apparatus that performs blow molding on a container by utilizing residual heat (internal heat quantity) from injection molding without cooling a preform 11 to room temperature.

The blow molding apparatus 20 includes an injection molding unit 21, a temperature adjusting unit 22, a blow molding unit 23, a taking-out unit 24, and a conveyance mechanism 26. The injection molding unit 21, the temperature adjusting unit 22, the blow molding unit 23, and the taking-out unit 24 are respectively disposed at positions rotated by a predetermined angle (for example, 90 degrees) around the conveyance mechanism 26.

(Conveyance Mechanism 26)

The conveyance mechanism 26 includes a rotating plate (not illustrated) that rotates about an axis in a direction perpendicular to the sheet surface of FIG. 1. On the rotating plate, one or more neck molds 27 (not illustrated in FIG. 1) for holding a neck portion 12 of the preform 11 or a resin container (hereinafter, simply referred to as a container) are arranged at every predetermined angle. The conveyance mechanism 26 rotates the rotating plate to convey the preform 11 (or the container) having the neck portion 12 held by the neck mold 27 to the injection molding unit 21, the temperature adjusting unit 22, the blow molding unit 23, and the taking-out unit 24 in this order. Note that the conveyance mechanism 26 can also raise and lower the rotating plate, and also performs operations related to mold closing and mold opening (mold releasing) for the preform in the injection molding unit 21.

(Injection Molding Unit 21)

Figure 2:
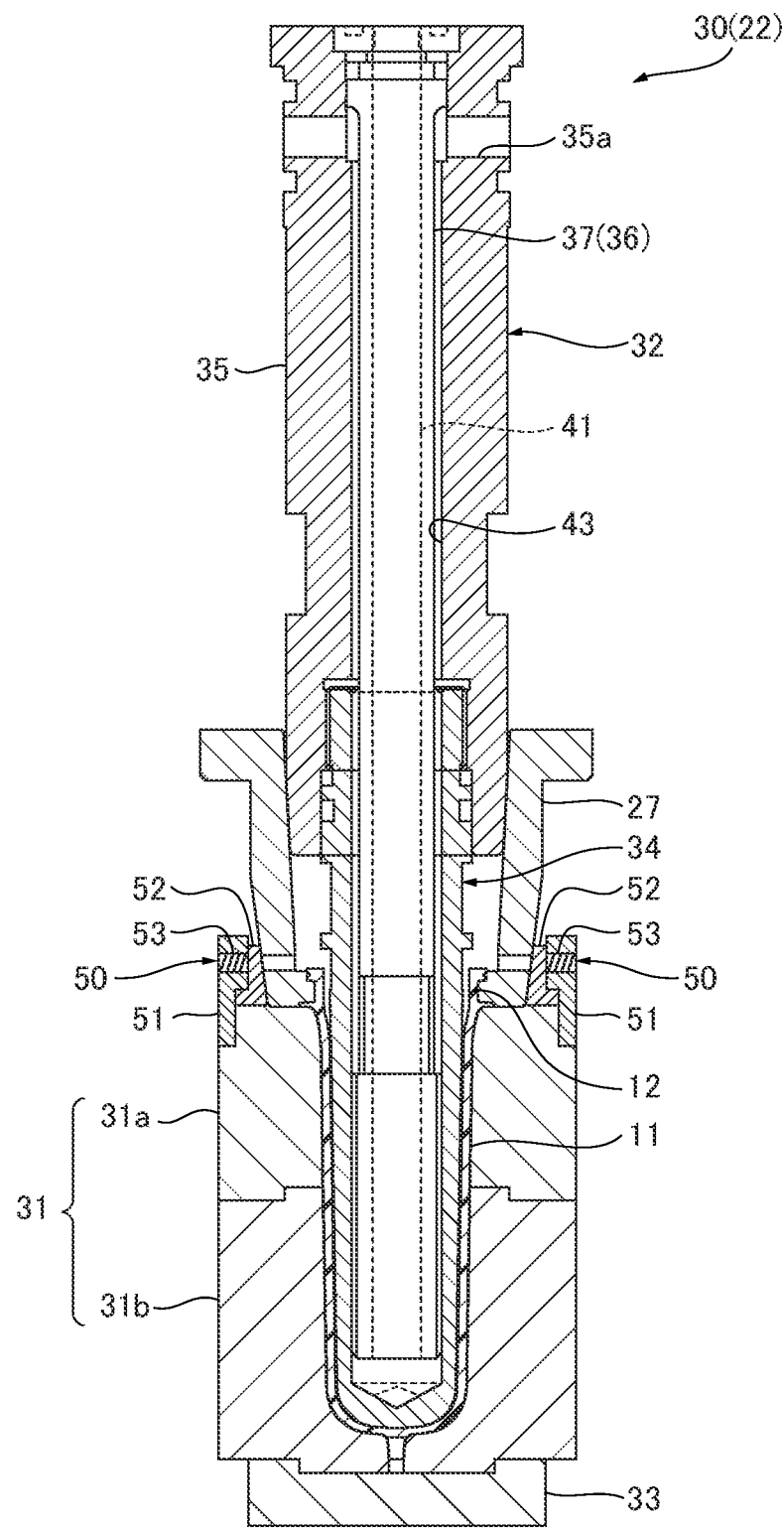
FIG. 2 is a view illustrating a configuration example of a temperature adjusting unit.

The injection molding unit 21 includes an injection cavity mold and an injection core mold, each of which is not illustrated, and manufactures the preform 11 illustrated in FIG. 2. An injection device 25 that supplies a resin material, which is a raw material of the preform 11, is connected with the injection molding unit 21.

In the injection molding unit 21, the injection cavity mold, the injection core mold, and the neck mold 27 of the conveyance mechanism 26, which have been described above, are closed to form a preform-shaped mold space. Then, the resin material is poured from the injection device 25 into such a preform-shaped mold space, and thus the preform 11 is manufactured by the injection molding unit 21.

Here, the entire shape of the preform 11 is a bottomed cylindrical shape in which one end side is opened and the other end side is closed. The neck portion 12 is formed at an end of the preform 11 on the opened side.

Further, the materials of the container and the preform 11 include a thermoplastic synthetic resin, and can be appropriately selected according to the use of the container. Specific examples of the materials include PET (polyethylene terephthalate), PEN (polyethylene naphthalate), PCTA (polycyclohexanedimethylene terephthalate), Tritan (Tritan (registered trademark): copolyester manufactured by Eastman Chemical Co., Ltd.), PP (polypropylene), PE (polyethylene), PC (polycarbonate), PES (polyethersulfone), PPSU (polyphenylsulfone), PS (polystyrene), COP/COC (cyclic olefin-based polymer), PMMA (polymethyl methacrylate: acrylic), PLA (polylactic acid), and the like.

Note that even when the injection molding unit 21 is opened, the neck mold 27 of the conveyance mechanism 26 is not released, and the preform 11 is held and conveyed as it is. The number of the preforms 11 simultaneously molded by the injection molding unit 21 (that is, the number of containers that can be simultaneously molded by the blow molding apparatus 20) can be appropriately set.

(Temperature Adjusting Unit 22)

The temperature adjusting unit 22 equalizes the temperatures or removes the uneven temperature in the preform 11 manufactured by the injection molding unit 21 to adjust the temperature of the preform 11 to a temperature suitable for blow molding (for example, about 90° C. to 105° C.). The temperature adjusting unit 22 also has a function of cooling the preform 11 in a high temperature state after the injection molding.

As illustrated in FIG. 2, the temperature adjusting unit 22 includes a mold unit 30 for temperature adjustment. The mold unit 30 is an example of a mold unit, and includes a cavity mold (temperature adjusting pot) 31 capable of accommodating the preform 11 and a core mold 32.

The cavity mold 31 is a mold including a space for temperature adjustment having substantially the same shape as the outer shape of the preform 11 that has been manufactured by the injection molding unit 21, and is disposed on a support base 33. The cavity mold 31 in the present embodiment includes an upper mold 31a and a lower mold 31b, which are divided into upper and lower two stages.

A flow path (not illustrated) through which a temperature adjustment medium (cooling medium) flows is formed inside each of the upper mold 31a and the lower mold 31b. Therefore, the temperature of the cavity mold 31 is maintained at a predetermined temperature by the temperature adjustment medium flowing inside the upper mold 31a and the lower mold 31b. By changing the temperature of the temperature adjustment medium in the upper mold 31a and in the lower mold 31b, the temperature distribution of the preform 11 may be changed in the longitudinal direction of the preform 11.

Note that the temperature of the temperature adjustment medium of the cavity mold 31 is not particularly limited, but can be appropriately selected within a range of, for example, 5° C. to 80° C., preferably 30° C. to 60° C.

Here, the configuration of the cavity mold 31 is not limited to the configuration in the present embodiment. For example, the cavity mold 31 may be configured to be vertically divided into three stages. Furthermore, for example, the cavity mold 31 may include a pair of split molds split in the longitudinal direction of the preform 11.

The core mold 32 is a mold to be inserted into the preform 11, and is disposed to be movable forward and backward with respect to the neck mold 27 that holds the preform 11 by the temperature adjusting unit 22. FIG. 2 illustrates a state in which the core mold 32 extends downward in the drawing and is inserted into the neck mold 27.

The core mold 32 includes at least a core pin (first core mold) 34, a main body portion 35 (second core mold), and a cooling pipe 36.

The core pin 34 is a bottomed cylindrical, bar-shaped member to be inserted into the preform 11, and has an outer shape substantially the same as the inner shape of the preform 11. In addition, a cylindrical inner space for the temperature adjustment medium to flow through is formed inside the core pin 34 along the axial direction.

The main body portion 35 is a member coupled with a drive mechanism (not illustrated) for driving the core mold 32 to move forward and backward, and the core pin 34 is coupled with a tip end side of the main body portion 35. A cylindrical inner space corresponding to the inner diameter of the core pin 34 is formed inside the main body portion 35 along the axial direction. The inner space of the main body portion 35 is connected with an introduction path 35a for the temperature adjustment medium. In addition, in a state in which the core pin 34 is attached to the main body portion 35, the inner spaces of the main body portion 35 and the core pin 34 are coaxially connected with each other, and form one liquid-tight (water-tight) cylindrical space in the core mold 32.

The cooling pipe 36 is a cylindrical member to be inserted into the inner space of the core mold 32 to be replaceable, and has a function of partitioning the flow of the temperature adjustment medium flowed from the introduction path 35a.

The outer diameter of the cooling pipe 36 is smaller than the inner space of the core mold 32, and the axial length of the cooling pipe 36 is set to be substantially the same in dimension as the axial length of the inner space of the core mold 32.

The inner space of the core mold 32, in a state in which the cooling pipe is inserted, is partitioned along the axial direction into a first flow path 43 on the outer circumferential side of the cooling pipe 36 and a second flow path 41 on the inner circumferential side of the cooling pipe 36. The first flow path 43 and the second flow path 41 communicate with each other at the tip end side of the cooling pipe 36 facing the inner bottom of the core pin 34. The first flow path 43 is connected with the introduction path 35a for the temperature adjustment medium in the main body portion 35, and the second flow path 41 is connected with a discharge path, not illustrated, for the temperature adjustment medium.

Accordingly, in the inside of the core mold 32, the temperature adjustment medium flows from the introduction path 35a of the main body portion 35 through the first flow path 43 toward the tip end side of the core mold 32, and the temperature adjustment medium turns back from the tip end side of the core mold 32 and flows through the second flow path 41 in the cooling pipe 36. Such a flow of the temperature adjustment medium maintains the core mold 32 at a predetermined temperature. Note that the above flow of the temperature adjustment medium is an example, and the flow of the temperature adjustment medium may be reversed to make the temperature adjustment medium flow from the second flow path 41 side.

Note that the temperature of the temperature adjustment medium in the core mold 32 is not particularly limited, but can be appropriately selected within a range of, for example, 5° C. to 80° C., preferably 30° C. to 60° C.

Further, in the core mold 32 in the present embodiment, the uneven temperature in the circumferential direction of the preform 11 can be adjusted by replacing the cooling pipe 36.

Figure 3:
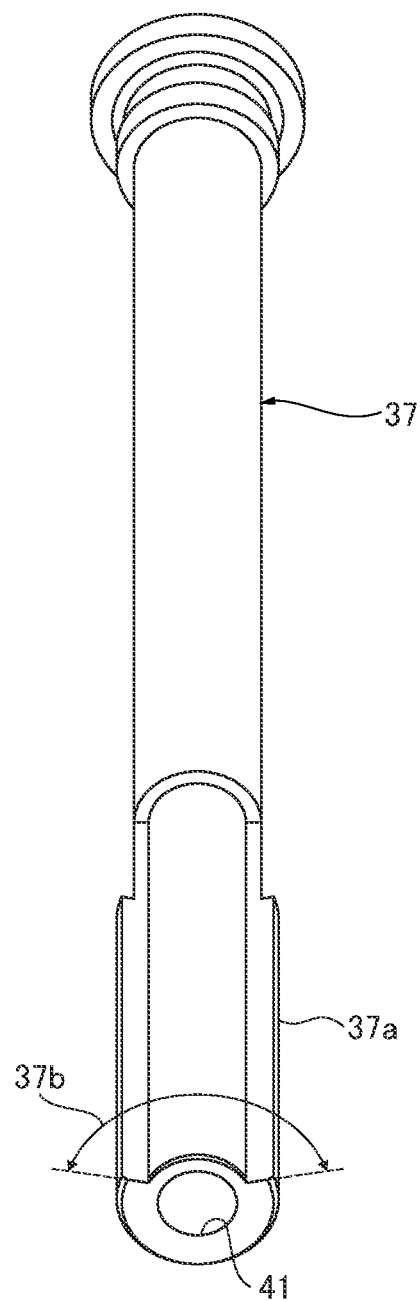
FIG. 3 is a perspective view illustrating a configuration example of an uneven temperature adjustment pipe.

FIG. 3 is a view illustrating an example of an uneven temperature adjustment pipe 37, which is a cooling pipe used for adjusting uneven temperature. The uneven temperature adjustment pipe 37 is configured to form the first flow path 43 in a part of the circumferential direction of the core mold 32.

As illustrated in FIG. 3, the uneven temperature adjustment pipe 37 includes the second flow path 41 extending in the axial direction at its center. In the uneven temperature adjustment pipe 37, a thick portion 37a having substantially the same diameter as the inner space of the core mold 32 is provided at a tip end part to be inserted into the core pin 34. The thick portion 37a is partially formed in the circumferential direction of the uneven temperature adjustment pipe 37.

Figure 4A:
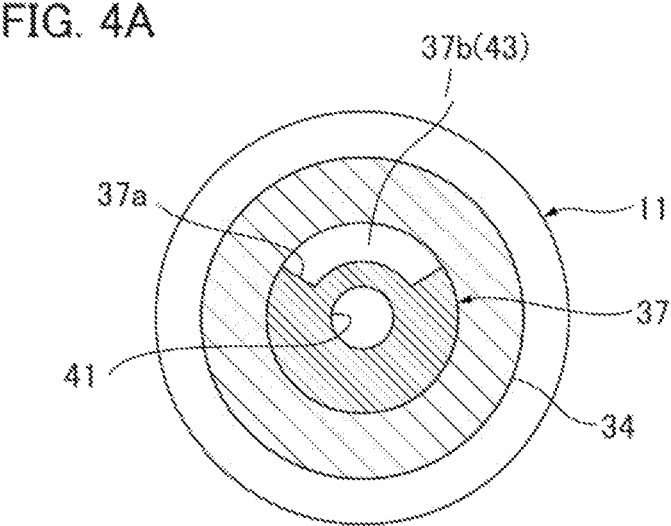
FIG. 4A is a cross-sectional view of a core pin when the uneven temperature adjustment pipe is inserted.

As illustrated in FIG. 4A, in a state in which the uneven temperature adjustment pipe 37 is inserted into the core mold 32, the outer circumference of the thick portion 37a is in contact with the inner circumferential surface of the core pin 34 (or is close proximity to the inner circumferential surface of the core pin 34 to such an extent that there is almost no distance). In addition, in a region where the thick portion 37a is not formed in the circumferential direction in the tip end part of the uneven temperature adjustment pipe 37, a notch 37b having an arc-shaped circumferential cross-section with a predetermined width in the radial direction is formed along the axial direction. Such a notch 37b forms the first flow path 43 at the tip end part of the uneven temperature adjustment pipe 37. Further, the outer circumference of the notch 37b is spaced apart from the inner circumferential surface of the core pin 34. Note that in a region where there is no thick portion in the axial direction of the uneven temperature adjustment pipe, the entire outer circumference of the pipe body defines the first flow path 43.

As illustrated in FIG. 4A, in the circumferential cross-section of the tip end part of the uneven temperature adjustment pipe 37, the temperature adjustment medium flows in the part of the notch 37b. Hence, the temperature of the core mold 32 in the vicinity of the notch 37b is likely to decrease. On the other hand, the temperature adjustment medium does not practically flow in the part of the thick portion 37a, and the distance between the surface of the core mold 32 and the flow path for the temperature adjustment medium increases. That is, the temperature of the core mold 32 is less likely to decrease in the vicinity of the thick portion 37a. For this reason, by using the uneven temperature adjustment pipe 37 illustrated in FIG. 3, a temperature difference in the circumferential direction of the core mold 32 can be generated.

In the present embodiment, several types of the uneven temperature adjustment pipes 37 respectively having different circumferential lengths of the notches 37b and different radial lengths of the notches 37b are prepared. Then, by changing the uneven temperature adjustment pipe 37 appropriately, the temperature distribution in the circumferential direction of the core mold 32 can be finely adjusted. Note that in the present embodiment, the uneven temperature adjustment pipe 37 in which the notches 37b are formed at a plurality of positions in the circumferential direction may be used.

Furthermore, the mold unit 30 in the present embodiment includes an eccentric mechanism 50 that adjusts a positional relationship between the axial center Z1 of the cavity mold 31 and the axial center Z2 of the core mold 32. As illustrated in FIG. 2, the eccentric mechanism 50 is disposed on an upper side of the cavity mold 31.

Figure 5A:
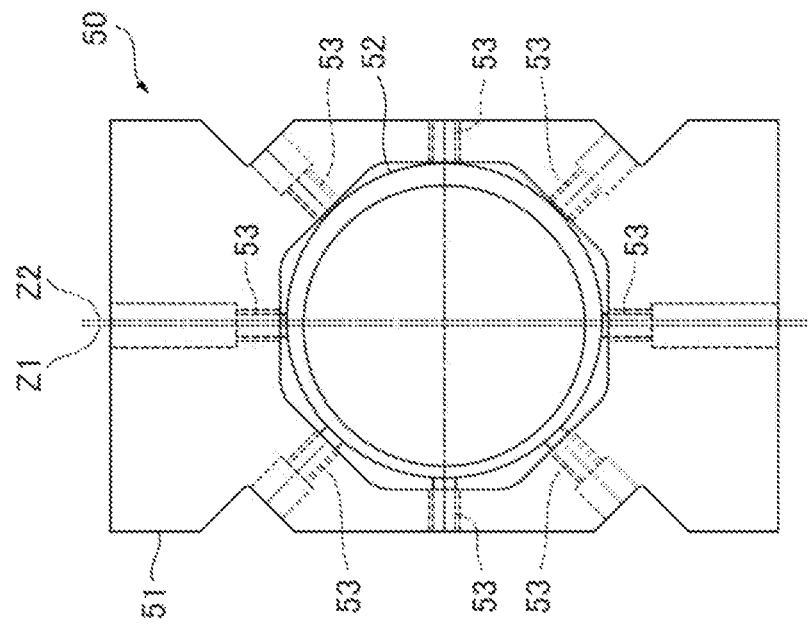
FIG. 5A is a plan view of an eccentric mechanism.
Figure 5B:
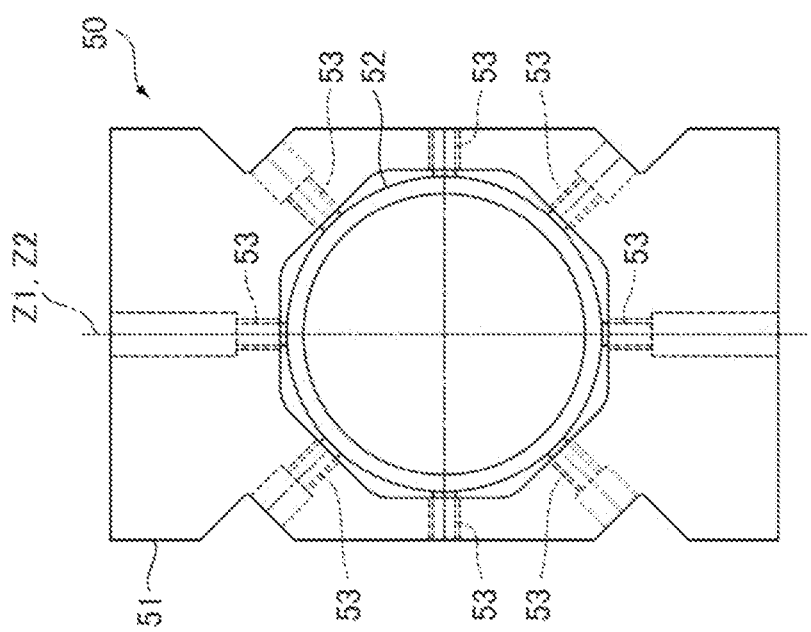
FIG. 5B is a view illustrating a state in which axial centers Z1 and Z2 are eccentric in the eccentric mechanism.

As illustrated in FIGS. 5A and 5B, the eccentric mechanism 50 includes a cylindrical centering ring 52 and a fixing portion 51 disposed around the centering ring 52. The centering ring 52 is an annular member that receives the neck mold 27, the center of which corresponds to the axial center Z2 of the core mold 32 to be inserted into the neck mold 27.

The fixing portion 51 is attached to the upper surface side of the cavity mold 31. At the center of the fixing portion 51, a space (ring arrangement portion) having a dimension larger than the outer diameter of the centering ring 52 is provided so that the centering ring 52 can be arranged. When the centering ring 52 is disposed in the ring arrangement portion of the fixing portion 51, a gap is formed between the outer circumference of the centering ring 52 and the fixing portion 51.

In the ring arrangement portion of the fixing portion 51, eight holding shafts 53 for holding the centering ring 52 are annularly arranged at intervals of 45 degrees around the centering ring 52. Each of the holding shafts 53 protrudes toward the inner circumferential side of the fixing portion 51. In the eccentric mechanism 50, a pair of holding shafts 53 arranged diagonally sandwich the centering ring 52. In addition, each of the holding shafts 53 is screwed into a screw hole provided in the fixing portion 51, and is movable forward and backward with respect to the centering ring 52. By adjusting forward and backward movements of the pair of diagonally arranged holding shafts 53, it is possible to adjust the position of the centering ring 52 in the ring arrangement portion of the fixing portion 51 along the moving directions of the holding shafts 53. Note that a thin sheet-like shim (not illustrated) may be sandwiched between the centering ring 52 and the holding shaft 53 for the position adjustment.

Accordingly, the eccentric mechanism 50 is capable of adjusting the positional relationship between the axial center Z1 of the cavity mold 31 and the axial center Z2 of the core mold 32 within a range of a gap in a planar direction orthogonal to the forward and backward direction of the core mold 32 (axial direction of the core mold 32). That is, when the core mold 32 is inserted into the preform, the guided position of the core mold 32 changes depending on the position of the centering ring 52. Therefore, the eccentric mechanism 50 is capable of causing the axial center Z2 of the core mold 32 and the axial center Z1 of the cavity mold 31 to be coincident with each other as illustrated in FIG. 5A, or to displace the axial centers Z1 and Z2 to be eccentric as illustrated in FIG. 5B.

(Blow Molding Unit 23)

Returning to FIG. 1, the blow molding unit 23 performs blow molding on the preform 11, the temperature of which has been adjusted by the temperature adjusting unit 22, to manufacture a container.

The blow molding unit 23 includes blow cavity molds that are a pair of split molds corresponding to the shape of the container, and an air introduction member that also serves as a stretching rod (neither of them is illustrated). The blow molding unit 23 manufactures a container by performing stretch blow molding on the preform 11.

(Taking-Out Unit 24)

The taking-out unit 24 is configured to release the neck portion 12 of the container that has been manufactured by the blow molding unit 23 from the neck mold 27, and to take out the container to the outside of the blow molding apparatus 20.

(Description of Blow Molding Method)

Next, a blow molding method by the blow molding apparatus 20 in the first embodiment will be described.

FIG. 6 is a flowchart illustrating steps of the blow molding method. In the present embodiment, before respective steps (S101 to S104) to be described later of the blow molding method are performed, an uneven temperature adjusting step (S100) of adjusting the temperature adjusting unit 22 is performed, based on a result of a test operation.

(Step S100: Uneven Temperature Adjusting Step)

The uneven temperature adjusting step is a step of adjusting the temperature distribution or the position of the core mold 32 in the temperature adjusting unit 22 in accordance with the temperature distribution of the preform 11 that has been injection-molded in the test operation or the thickness distribution of the container that has been blow-molded in the test operation.

Figure 4B:
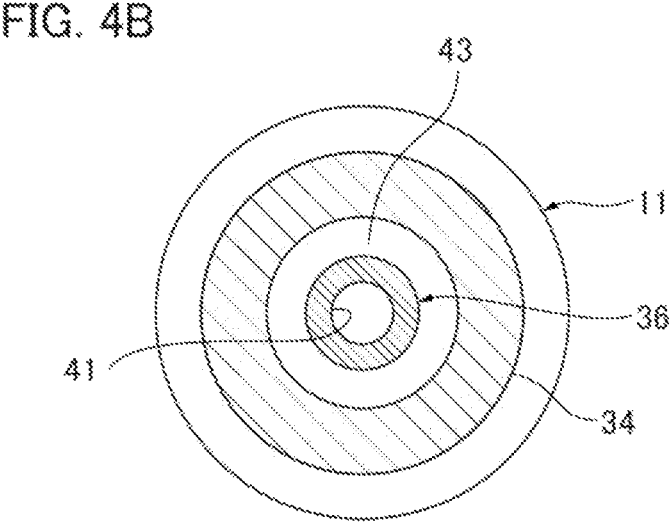
FIG. 4B is a cross-sectional view of the core pin when a cooling pipe is inserted.

In the test operation of the blow molding apparatus 20, for example, the cooling pipe 36 without the thick portion and without the function of uneven temperature adjustment is disposed in the core mold 32. FIG. 4B illustrates a cross-sectional view of the core pin 34 when the cooling pipe 36 without the function of uneven temperature adjustment is inserted.

In addition, in the above test operation, the eccentric mechanism 50, for example, as illustrated in FIG. 5A, is brought into a state in which the positions of the axial center Z1 of the cavity mold 31 and the axial center Z2 of the core mold 32 are coincident with each other. The blow molding apparatus 20 is operated in the above state, and information about the temperature distribution of the preform 11 or the thickness distribution of the container before adjustment is obtained.

As a result of the above test operation, in a case where there is unevenness in the temperature distribution of the preform 11 or the thickness distribution of the container, the temperature distribution or the position of the core mold 32 in the temperature adjusting unit 22 is adjusted as follows. In the following description, as an example, it is assumed that the temperature distribution of the preform 11 or the thickness distribution of the container is adjusted to decrease unevenness in the circumferential direction.

For example, in a case where there is unevenness in the temperature distribution in the circumferential direction of the preform 11, the cooling pipe 36 inserted into the core mold 32 is replaced with the uneven temperature adjustment pipe 37 illustrated in FIG. 3. At this time, the uneven temperature adjustment pipe 37 is arranged in the core mold 32 such that the position of the notch 37b in the circumferential direction faces a part having a higher temperature in the preform 11 in the circumferential direction.

By the above adjustment, the first flow path 43 is arranged in the vicinity of the part having a higher temperature in the preform 11, in the circumferential direction of the core mold 32. On the other hand, the thick portion 37a of the uneven temperature adjustment pipe 37 is arranged in the vicinity of a part having a lower temperature in the preform 11, and the distance between the preform 11 and the flow path for the temperature adjustment medium increases. Accordingly, the part having a higher temperature at the time of test operation in the circumferential direction of the preform 11 is more likely to be subjected to heat exchange than the other parts, thus it is possible to reduce the unevenness in the temperature distribution in the circumferential direction of the preform 11.

Further, in a case where there is unevenness in the temperature distribution in the circumferential direction of the preform 11, in addition to the use of the core mold 32 into which the above-described uneven temperature adjustment pipe 37 is inserted, the axial center Z1 of the cavity mold 31 and the axial center Z2 of the core mold 32 may be displaced to be eccentric by the eccentric mechanism 50, so that the thickness distribution of the preform 11 may be adjusted by the position adjustment of the core mold 32.

Specifically, it is sufficient if the eccentric mechanism 50 is adjusted so that the axial center Z2 of the core mold 32 approaches the part having a higher temperature in the preform 11. Accordingly, it is possible to partially reduce the thickness of the preform 11 at the part having a higher temperature in the circumferential direction of the preform 11, in the test operation.

When the thickness of the preform 11 is partially reduced, the residual heat in the preform 11 in the reduced part is reduced. That is, by partially reducing the thickness of the preform 11, it is possible to adjust the unevenness of the residual heat in the circumferential direction of the preform 11, and thus it is possible to adjust the thickness distribution of the container to be manufactured. Furthermore, by using the core mold 32 including the uneven temperature adjustment pipe 37 in which the notch 37*b* of 37 is arranged to be substantially opposed to the part having a higher temperature (a thinned part) of the preform 11, it is possible to more efficiently adjust the unevenness of the residual heat in the circumferential direction of the preform 11.

In addition, when various adjustments are performed in the uneven temperature adjusting step based on the thickness distribution of the container that has been manufactured in the test operation, it is sufficient if the adjustments are performed as follows.

In the single-stage blow molding, the part having a higher temperature in the preform 11 has large residual heat, and the preform 11 is likely to be stretched. That is, the part where the thickness of the container is thinner corresponds to the part where the temperature of the preform 11 is higher. On the other hand, in the part where the temperature of the preform 11 is lower, the residual heat is smaller than the part where the temperature of the preform 11 is higher, so the preform 11 is less likely to be stretched. That is, the thicker part of the container corresponds to the lower temperature part of the preform 11.

Therefore, in the case of performing various adjustments in the uneven temperature adjusting step based on the thickness distribution of the container, the adjustment can be made in the same manner as described above with the thinner part of the container regarded as the higher temperature part of the preform 11 and the thicker part of the container regarded as the lower temperature part of the preform 11.

In the uneven temperature adjusting step, either the adjustment of the temperature distribution of the core mold 32 by the uneven temperature adjustment pipe 37 or the position adjustment of the core mold by the eccentric mechanism 50 may be performed, or both may be performed in combination.

When the uneven temperature adjusting step is completed, the respective steps in the blow molding method to be described below will be performed.

(Step S101: Injection Molding Step)

First, in the injection molding unit 21, a resin is injected from the injection device 25 into a preform-shaped mold space formed by the injection cavity mold, the injection core mold, and the neck mold 27 of the conveyance mechanism 26, and the preform 11 is manufactured.

In step S101, the injection molding unit 21 is opened immediately after the end of resin filling or after the minimum cooling time provided after resin filling. That is, the preform 11 in a high temperature state in which the outer shape of the preform 11 can be maintained is released from the injection cavity mold and the injection core mold. Then, the rotating plate of the conveyance mechanism 26 rotates by a predetermined angle, and the preform 11 held by the neck mold 27 is conveyed to the temperature adjusting unit 22.

Here, a temperature change of the preform 11 in the blow molding method in the present embodiment will be described with reference to FIG. 7. The vertical axis of FIG. 7 represents the temperature of the preform 11, and the horizontal axis of FIG. 7 represents time. In FIG. 7, an example of temperature change of a preform in the present embodiment is indicated by (A) in FIG. 7. In addition, an example of temperature change of a preform in a comparative example (conventional method) to be described later is indicated by (B) of FIG. 7. Note that blanks between the respective steps mean the time required to convey the preform 11 or the container 10, and are identical to one another.

In the present embodiment, when a resin material is injection-molded at a temperature equal to or higher than the melting point of the resin material, the injection molding unit 21 performs only minimum cooling of the preform 11 that has been subjected to the injection molding, and the temperature adjusting unit 22 cools and adjusts the temperature of the preform 11. In the present embodiment, after the injection molding unit 21 completes the injection of the resin material, the time (cooling time) for cooling the resin material is preferably ½ or less the time (injection time) for injecting the resin material. In addition, the time for cooling the resin material can be made shorter than the time for injecting the resin material in accordance with the weight of the resin material. The time for cooling the resin material is more preferably ⅖ or less, still more preferably ¼ or less, and particularly preferably ⅕ or less the time for injecting the resin material. The cooling time is significantly shortened as compared with the comparative example. Thus, a skin layer (surface layer in a solidified state) of the preform is formed thinner than a conventional one, and a core layer (inner layer in a softened or molten state) is formed thicker than the conventional one. That is, as compared with the comparative example, a preform having a large thermal gradient between the skin layer and the core layer and having high residual heat at a high temperature is formed.

In the present embodiment, the preform 11 that has been injection-molded is released from the injection molding unit 21 at a higher release temperature than that of the comparative example, and is conveyed to the temperature adjusting unit 22. With the movement to the temperature adjusting unit 22, the temperature of the preform 11 is equalized by heat exchange (heat conduction) between the skin layer and the core layer. Further, the preform 11 is slightly cooled from the outer surface by contact with the outside air. However, the temperature of the preform 11 is maintained at a substantially high release temperature, until the preform 11 is conveyed to the temperature adjusting unit 22. In the temperature adjusting unit 22, the temperature of the preform 11 decreases from the high release temperature to a blow temperature, and then the temperature of the preform 11 is maintained at the blow temperature until blow molding is performed.

Note that the blow temperature is a temperature suitable for the blow molding, and is set to 90° C. to 105° C. for a PET resin, for example. However, a lower blow temperature makes the stretching orientation of the preform 11 better, and is capable of enhancing the strength (physical property) of the container. For this reason, the blow temperature is preferably set to 90° C. to 95° C. for a PET resin, for example.

Here, due to the structure of the blow molding apparatus 20, the injection molding step, the temperature adjusting step, the blow molding step, and the container taking-out step respectively have the same lengths of time. Similarly, the conveyance times between the respective steps are the same.

On the other hand, as the comparative example, a description will be given with regard to an example of temperature change of the preform (FIG. 7B) in a case where the preform 11 is cooled in the injection molding step.

In the comparative example, the preform 11 is cooled to a temperature lower than or substantially the same as the blow temperature in the mold of the injection molding unit 21. As a result, in the comparative example, the time of the injection molding step is longer than that in the present embodiment. In such a case, the times of the respective steps are set in accordance with the time of the longest injection molding step. Hence, the time of the molding cycle of the container becomes long as a result.

(Step S102: Temperature Adjusting Step)

Subsequently, the temperature adjusting unit 22 makes a temperature adjustment for bringing the temperature of the preform 11 close to a temperature suitable for a final blow.

As illustrated in FIG. 2, in the temperature adjusting step, first, the preform 11 is accommodated in the preform-shaped space for temperature adjustment of the cavity mold 31. Subsequently, the core mold 32 is inserted into the preform 11 accommodated in the cavity mold 31.

In the temperature adjusting step, the preform 11 is brought into contact with the cavity mold 31 and the core mold 32, so that the temperature of the preform 11 is adjusted so as not to be equal to or lower than a temperature suitable for blow molding, and unevenness of temperature that has been generated in the injection molding is also reduced. Note that the cavity mold 31 and the core mold correspond to the shape of the preform 11, and thus the shape of the preform is maintained in a desired shape also in the temperature adjusting step.

After the temperature adjusting step, the rotating plate of the conveyance mechanism 26 rotates by a predetermined angle, and the preform 11 that has been subjected to the temperature adjustment and that is held in the neck mold 27 is conveyed to the blow molding unit 23.

(Step S103: Blow Molding Step)

Subsequently, the container is blow-molded in the blow molding unit 23.

First, the blow molding mold is closed to accommodate the preform 11 in the mold space, and an air introduction member is inserted into the neck portion 12 of the preform 11. Then, blow air is introduced into the preform 11 from the air introduction member, while the air introduction member including at least the stretching rod and the blow core mold being lowered. Accordingly, the preform 11 is bulged and shaped to be in close contact with the mold space of the blow molding mold, and is blow-molded into a container.

(Step S104: Container Taking-Out Step)

When the blow molding ends, the blow molding mold is opened. Accordingly, the container becomes movable from the blow molding unit 23.

Subsequently, the rotating plate of the conveyance mechanism 26 rotates by a predetermined angle, and the container is conveyed to the taking-out unit 24. In the taking-out unit 24, the neck portion 12 of the container is released from the neck mold 27, and the container is taken out to the outside of the blow molding apparatus 20.

Heretofore, a series of steps in the blow molding method ends. Then, the rotating plate of the conveyance mechanism 26 is rotated by a predetermined angle, so that the respective steps of S101 to S104 described above are repeated.

Hereinafter, advantages of the blow molding apparatus and the blow molding method in the first embodiment will be described.

In a case where a hot parison type preform is molded with a crystalline thermoplastic resin (a resin that can be in a transparent amorphous state or a cloudy crystalline state) used as a material, whitening (cloudiness) may occur due to insufficient cooling depending on the material. For example, in a case where a PET resin is used as a material, when the preform is slowly cooled (for example, cooled at room temperature for ten and a few seconds) in a temperature zone (120° C. to 200° C.) in which crystallization is promoted, crystallization due to spherulite formation occurs, and the preform tends to be whitened.

For this reason, conventionally, the injection molding mold of the preform is rapidly cooled (for example, at 10° C. for five seconds) to shorten the passage time in the above crystallization temperature zone, and the preform is sufficiently cooled in the injection molding step to suppress whitening of the preform.

On the other hand, according to the blow molding method in the present embodiment, the step of cooling the preform 11 is almost eliminated in the injection molding step (S101), and the preform 11 is cooled in the temperature adjusting step (S102). In the temperature adjusting step (S102), by bringing the preform 11 into close contact with the cavity mold 31 and the core mold, the preform 11 can be cooled simultaneously with the temperature adjustment of the preform 11. In the present embodiment, the temperature adjustment and cooling of the preform 11 can be performed in the temperature adjusting step (S102). Thus, it is possible to release the preform 11 even in a high temperature state in the injection molding step (S101), and to start molding the next preform 11 early. That is, according to the present embodiment, the container can be favorably molded, while the molding cycle time is shortened as compared with the molding cycle time in the comparative example.

In addition, according to the present embodiment, the temperature distribution of the core mold 32 is adjusted in the circumferential direction using the uneven temperature adjustment pipe 37, in the uneven temperature adjusting step (S100). Accordingly, the uneven temperature of the preform 11 in the circumferential direction is suppressed, and the efficiency of additional cooling and temperature adjustment is improved, and thus it is possible to favorably mold the container in the blow molding.

In the uneven temperature adjusting step (S100), the axial center Z1 of the cavity mold 31 and the axial center Z2 of the core mold 32 may be displaced to be eccentric by the eccentric mechanism 50 to adjust the thickness distribution of the preform 11. This also adjusts the unevenness of the residual heat in the circumferential direction of the preform 11, and thus it is possible to favorably mold the container in the blow molding.

In particular, the molding cycle time is shortened, and so the time for temperature adjustment of the preform in the temperature adjusting step (S102) is also shortened. According to the present embodiment, the temperature distribution or the position of the core mold 32 is optimized for the uneven temperature adjustment in the uneven temperature adjusting step (S100). Therefore, the temperature adjustment is enabled in a short time in the temperature adjusting step (S102). That is, shortening of the molding cycle is achieved without quality degradation of the container to be manufactured.

Second Embodiment

A second embodiment is a modification of the first embodiment.

In the following description of the second embodiment, the same elements as those of the first embodiment are denoted by the same reference numerals, and overlapping descriptions will be omitted. The blow molding apparatus 20 in the second embodiment is different in the configuration of the mold unit 30 of the temperature adjusting unit 22.

Figure 8:
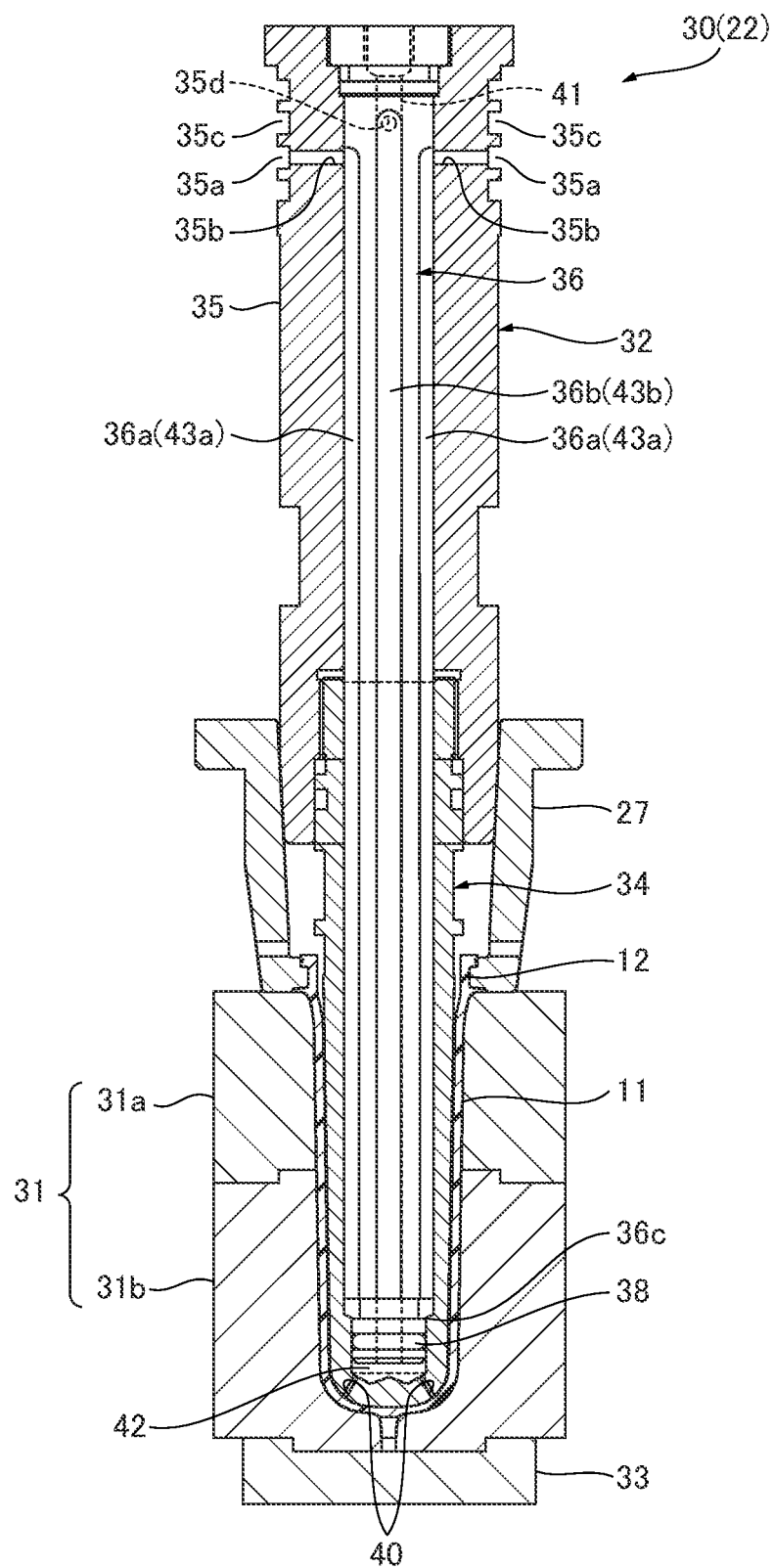
FIG. 8 is a diagram illustrating a configuration example of a temperature adjusting unit in a second embodiment.

FIG. 8 is a diagram illustrating a configuration example of a temperature adjusting unit in the second embodiment. As illustrated in FIG. 8, the temperature adjusting unit 22 includes a mold unit 30 for temperature adjustment. The mold unit 30 is an example of a mold unit, and includes a cavity mold (temperature adjusting pot) 31 capable of accommodating the preform 11 and a core mold 32. The configuration of the cavity mold 31 is the same as that in the first embodiment.

The core mold 32 is a mold to be inserted into the preform 11, and is disposed to be movable forward and backward with respect to the neck mold 27 that holds the preform 11 by the temperature adjusting unit 22. FIG. 8 illustrates a state in which the core mold 32 extends downward in the drawing and is inserted into the neck mold 27.

The core mold 32 includes at least a core pin (first core mold) 34, a main body portion (second core mold) 35, and a cooling pipe 36.

The core pin 34 is a bottomed cylindrical, bar-shaped member to be inserted into the preform 11, and has an outer shape substantially the same as the inner shape of the preform 11. In addition, a cylindrical inner space for the temperature adjustment medium to flow through is formed inside the core pin 34 along the axial direction.

An exhaust port 40 communicating with the inner space of the core pin 34 is formed at a tip end of the core pin 34 facing the bottom surface of the preform 11. The exhaust port 40 of the core pin 34 has a function of discharging the air in the preform 11 into the core pin 34, when the core mold 32 is inserted into the preform 11, and improving the contact property between the core mold 32 and the preform 11.

Figure 10A:
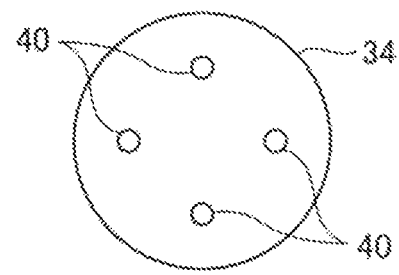
FIG. 10A is a bottom view of a core mold in the second embodiment.

The exhaust port 40 is formed in a shape to be rotationally symmetric in the circumferential direction of the core mold 32 (more specifically, the core pin 34) with respect to the central axis of the core mold 32 (more specifically, the core pin 34). In a case where the exhaust port 40 is formed to be rotationally symmetric in the circumferential direction of the core mold 32 (more specifically, the core pin 34), the air in the preform 11 is easily discharged uniformly without unevenness in the circumferential direction. Thus, uneven contact between the core mold 32 and the preform 11 is less likely to occur. For example, in FIG. 10A, four exhaust ports 40 are formed at the tip end of the core pin 34 at intervals in the circumferential direction to be point symmetric at intervals of 90 degrees. It is needless to say that the exhaust ports 40 do not necessarily have to be rotationally symmetric. For example, at the tip end of the core mold 32 (more specifically, the core pin 34), a plurality of exhaust ports 40 may be disposed at any positions within a predetermined distance range from its central axis.

Note that the number of the exhaust ports 40 provided in the core pin 34 may be any number other than four (an integer of two, three, or more), as long as the arrangement is rotationally symmetric with respect to the central axis of the core mold 32. In addition, one exhaust port 40 may be provided at the position of the central axis of the core pin 34 (the center of the core pin).

The main body portion 35 is a member coupled with a drive mechanism (not illustrated) for driving the core mold 32 to move forward and backward, and the core pin 34 is coupled with a tip end side of the main body portion 35. A cylindrical inner space corresponding to the inner diameter of the core pin 34 is formed inside the main body portion 35 along the axial direction. In addition, in a state in which the core pin 34 is attached to the main body portion 35, the inner spaces of the main body portion 35 and the core pin 34 are coaxially connected with each other, and form one liquid-tight (water-tight) cylindrical space in the core mold 32.

Figure 11A:
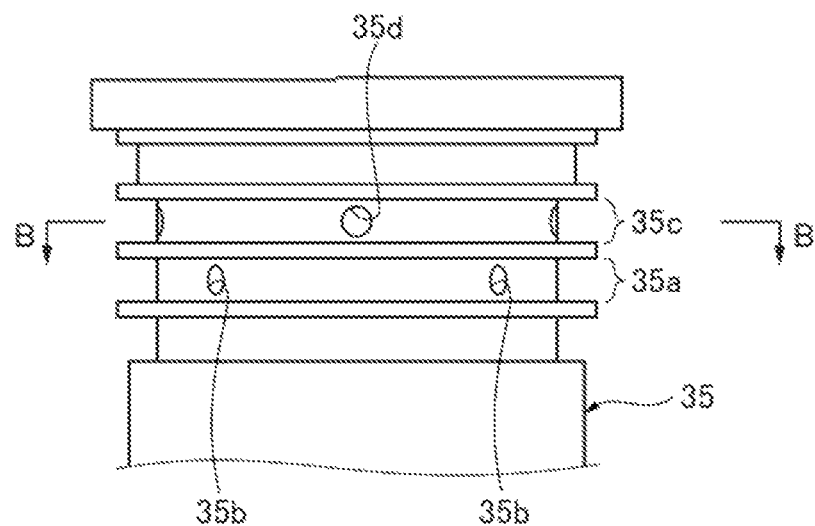
FIG. 11A is a view illustrating a first annular groove and a second annular groove of a main body portion in the second embodiment.

As illustrated in FIG. 11A, a first annular groove 35a and a second annular groove 35c each extending along the circumferential direction are formed in parallel with each other on the outer circumference of the main body portion 35.

Figure 11B:
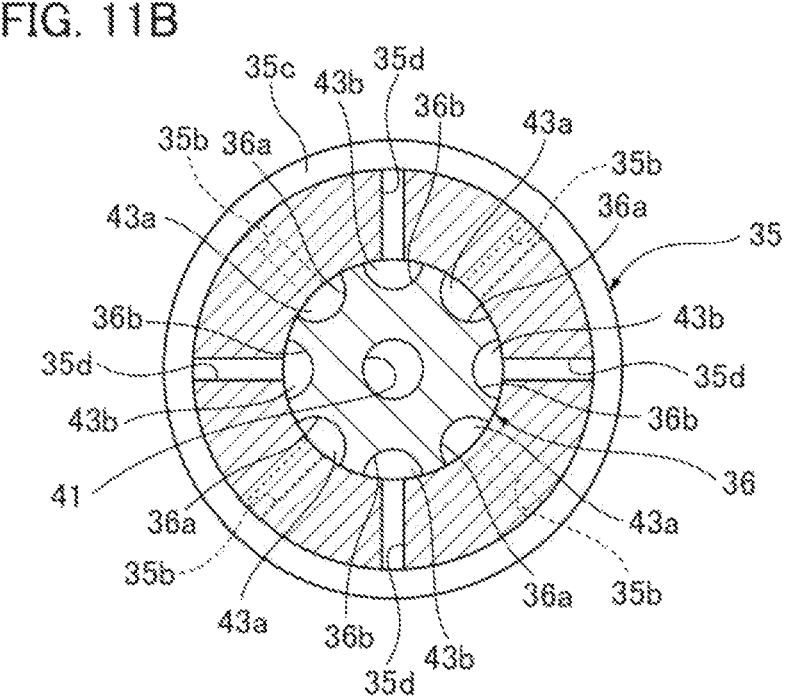
FIG. 11B is a cross-sectional view taken along line B-B of FIG. 11A.

As illustrated in FIG. 11B, four first through holes 35b communicating with the inner space are formed in the first annular groove 35a at intervals of 90 degrees in the circumferential direction. The first annular groove 35a has a function of receiving a temperature adjustment medium from an introduction path, not illustrated, and guiding the temperature adjustment medium to the inside of the core mold 32 through the first through holes 35b.

In addition, in the second annular groove 35c, a plurality of (for example, four) second through holes 35d communicating with the inner space are formed at intervals of a predetermined angle (for example, 90 degrees) in the circumferential direction. As illustrated in FIG. 11B, the first through holes 35b and the second through holes 35d are formed at positions displaced by a predetermined angle (for example, 45 degrees) in the circumferential direction. The second annular groove 35c has a function of receiving the temperature adjustment medium discharged from the inside of the core mold 32 through the second through holes 35d and guiding the temperature adjustment medium to a discharge path, not illustrated.

The cooling pipe 36 is a cylindrical member to be inserted into the inner space of the core mold 32.

The outer circumference of the cooling pipe 36 partitions the inner space of the core mold 32 along the axial direction, and forms a first flow path 43a and a second flow path 43b for the temperature adjustment medium.

Figure 9:
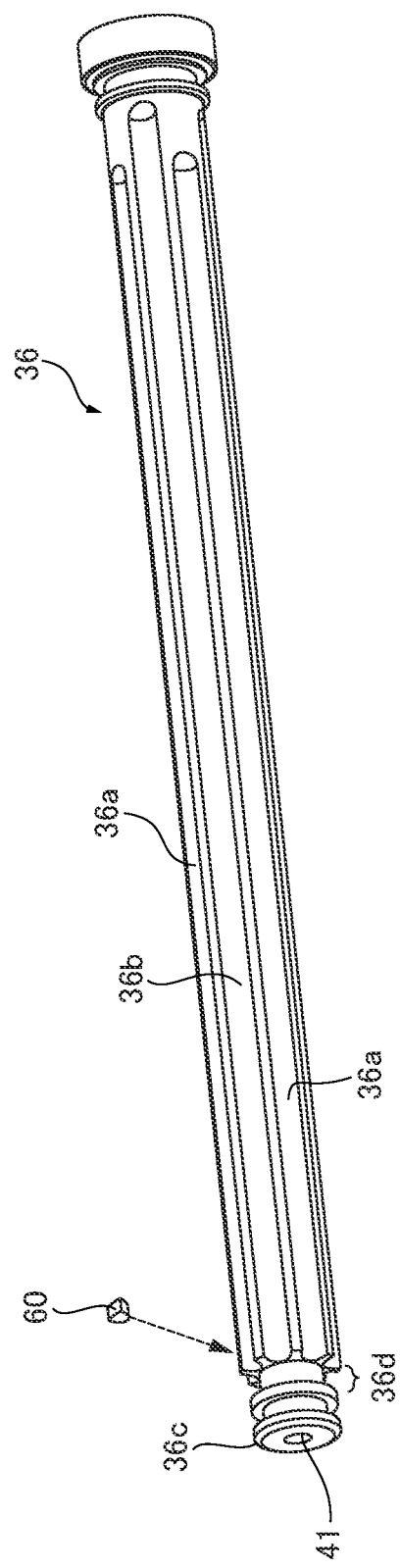
FIG. 9 is a perspective view illustrating a configuration example of a cooling pipe in the second embodiment.
Figure 10B:
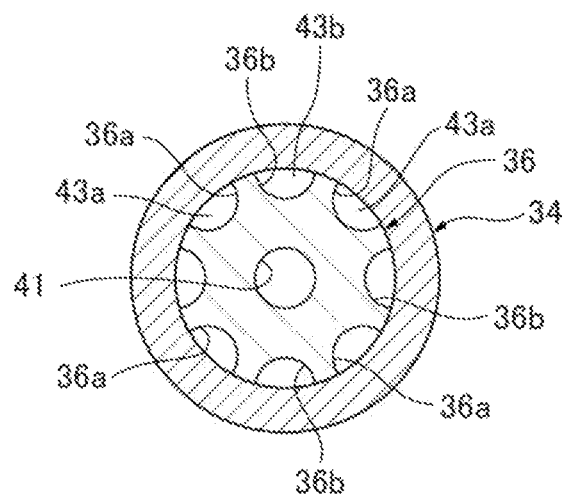
FIG. 10B is a cross-sectional view of a core pin of the core mold in the second embodiment.

As illustrated in FIG. 9, first grooves 36a and second grooves 36b each extending along the axial direction are formed in parallel with one another on the outer circumference of the cooling pipe 36. As illustrated in FIG. 10B, a plurality of (for example, four) first grooves 36a and a plurality of (for example, four) second grooves 36b are formed at intervals of a predetermined angle (for example, 90 degrees) in the circumferential direction of the cooling pipe 36. The first grooves 36a and the second grooves 36b are formed at positions displaced by a predetermined angle (for example, 45 degrees) in the circumferential direction of the cooling pipe 36, and are alternately arranged in the circumferential direction of the cooling pipe 36.

Note that it is possible to close the first groove 36a and the second groove 36b by fitting stoppers 60 each corresponding to the shape of the groove. The stopper 60 is formed of, for example, a rubber material.

As illustrated in FIG. 8, the first grooves 36a extend from the tip end side of the cooling pipe 36 to a position corresponding to the first annular groove 35a of the main body portion 35. Similarly, the second grooves 36b extend from the tip end side of the cooling pipe 36 to a position corresponding to the second annular groove 35c of the main body portion 35. The first groove 36a of the cooling pipe 36 is disposed at a position corresponding to the first through hole 35b of the main body portion 35, and the second groove 36b of the cooling pipe 36 is disposed at a position corresponding to the second through hole 35d of the main body portion 35.

In addition, as illustrated in FIGS. 8 and 9, a circular sealing portion 36c into which an O-ring 38 is fitted is provided on the outer circumference of the tip end of the cooling pipe 36. The sealing portion 36c has a function of partitioning an exhaust chamber 42 formed on the tip end side of the core pin 34 and the flow paths 43a and 43b for the temperature adjustment medium formed on the outer circumference of the cooling pipe 36 in the axial direction.

Further, as illustrated in FIG. 9, in the axial direction of the cooling pipe 36, a region 36d connecting the first grooves 36a and the second grooves 36b in the circumferential direction is provided in the vicinity of the sealing portion 36c.

Further, an exhaust path 41 extending in the axial direction from one end to the other end of the cooling pipe 36 is formed inside the cooling pipe 36. The exhaust path 41 has a function of discharging the air that has flowed into the core pin 34 from the exhaust port 40 of the core pin 34 to the outside of the core mold 32.

In an assembled state in which the cooling pipe 36 is inserted into the core mold 32, an exhaust chamber 42 connected with the above exhaust port 40 and the exhaust path 41 is formed between the bottom surface side of the inner space of the core pin 34 and the tip end of the cooling pipe 36. Accordingly, when the core mold 32 is inserted into the preform 11, the air in the preform 11 is guided from the exhaust port 40 of the core pin 34 through the exhaust chamber 42 to the exhaust path 41, and is then exhausted to the outside. Note that the exhaust chamber 42 is sealed to the flow paths 43a and 43b for the temperature adjustment medium by the O-ring 38.

Further, in the assembled state in which the cooling pipe 36 is inserted into the core mold 32, the first flow path 43a for the temperature adjustment medium is formed by the inner circumference of the core mold 32 and the first groove 36a of the cooling pipe 36. Similarly, the second flow path 43b for the temperature adjustment medium is formed by the inner circumference of the core mold 32 and the second groove 36b of the cooling pipe 36.

The first flow path 43a and the second flow path 43b are connected with each other in the region 36d in the vicinity of the sealing portion 36c, and the flow of the temperature adjustment medium is configured to turn back at the tip end of the core mold 32. In the present embodiment, both the first flow path 43a and the second flow path 43b are formed on the outer circumference of the cooling pipe 36, and thus it is possible to facilitate processing of the flow path for the temperature adjustment medium in the cooling pipe 36.

In the inside of the core mold 32, the temperature adjustment medium flows from the first annular groove 35a of the main body portion 35 through the first flow path 43a toward the tip end side of the core mold 32, and the temperature adjustment medium flows from the tip end side of the core mold 32 through the second flow path 43b toward the second annular groove 35c of the main body portion 35. Such a flow of the temperature adjustment medium maintains the core mold 32 at a predetermined temperature. Note that the above flow of the temperature adjustment medium is an example, and the flow of the temperature adjustment medium may be reversed to make the temperature adjustment medium flow from the second flow path 43b side.

Further, in the second embodiment, the flow of the temperature adjustment medium may be regulated in either the first flow path 43a or the second flow path 43b disposed in the circumferential direction of the core mold 32 so as to generate a temperature difference in the circumferential direction of the core mold 32.

Figure 10C:
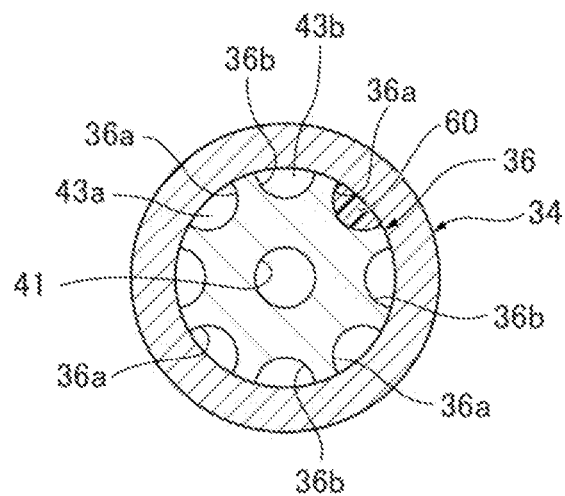
FIG. 10C is a view illustrating a state in which a stopper is disposed in FIG. 10B.

FIG. 10C illustrates an example in which the flow of the temperature adjustment medium is regulated in a part of the first flow path 43a. In the example of FIG. 10C, a stopper 60 corresponding to the groove shape is fitted into the first groove 36a on the upper right in the drawing to close the first flow path 43a. In the first flow path 43a in which the stopper 60 is disposed, the temperature adjustment medium does not flow.

In the example of FIG. 10C, the temperature adjustment medium flows in the flow paths 43a and 43b in which no stopper 60 is disposed. Therefore, the temperature of the core mold 32 is likely to decrease in the vicinity of these flow paths. On the other hand, the temperature adjustment medium does not flow through the first flow path 43a in which the stopper 60 is disposed, heat exchange between the surface of the core mold 32 and the temperature adjustment medium becomes difficult, and the temperature of the core mold 32 is less likely to decrease. In this manner, by providing the flow path in which the flow of the temperature adjustment medium is regulated in the circumferential direction of the core mold 32, a temperature difference can be generated in the circumferential direction of the core mold 32.

Note that the flow path in which the stopper 60 is disposed is not limited to the example of FIG. 10C, and the flow of the temperature adjustment medium can be regulated in any flow path in the circumferential direction. In addition, a plurality of flow paths may be disposed with the stoppers 60.

The steps of the blow molding method in the second embodiment are the same as those in the first embodiment except for the uneven temperature adjusting step (S100 in FIG. 6) and the temperature adjusting step (S102 in FIG. 6).

The uneven temperature adjusting step (S100 in FIG. 6) in the second embodiment is performed in the following procedure.

First, in a test operation of the blow molding apparatus 20, the blow molding apparatus 20 is operated in a state in which the flow of the temperature adjustment medium is not regulated in the core mold 32 (FIG. 10B), and information about the temperature distribution of the preform 11 or the thickness distribution of the container before the adjustment is obtained.

As a result of the above test operation, in a case where there is unevenness in the temperature distribution of the preform 11 or the thickness distribution of the container, the temperature distribution of the core mold 32 in the temperature adjusting unit 22 is adjusted as follows. In the following description, as an example, it is assumed that the temperature distribution of the preform 11 or the thickness distribution of the container is adjusted to decrease unevenness in the circumferential direction.

For example, in a case where there is unevenness in temperature distribution in the circumferential direction of the preform 11, the stopper(s) 60 is/are disposed for the flow paths 43a and/or 43b present in the vicinity of a part having a lower temperature in the preform 11 in the circumferential direction.

By the above adjustment, in the circumferential direction of the core mold 32, the flow of the temperature adjustment medium is selectively restricted in the vicinity of the part having a lower temperature in the preform 11. Accordingly, heat exchange between the surface of the core mold 32 and the temperature adjustment medium becomes difficult in the part having a lower temperature in the test operation in the circumferential direction of the preform 11, and the temperature of the core mold 32 is less likely to decrease. Therefore, it is possible to reduce the unevenness in the temperature distribution in the circumferential direction of the preform 11.

In addition, various adjustments in the uneven temperature adjusting step based on the thickness distribution of the container that has been manufactured in the test operation can be made in the same manner as the first embodiment. After the uneven temperature adjusting step is completed, the respective steps (S101 to S104 in FIG. 6) in the blow molding method are performed.

In the temperature adjusting step (S102 in FIG. 6) in the second embodiment, as illustrated in FIG. 8, first, the preform 11 is accommodated in the preform-shaped space for temperature adjustment of the cavity mold 31. Subsequently, the core mold 32 is inserted into the preform 11 accommodated in the cavity mold 31.

In the temperature adjusting step in the second embodiment, the preform 11 is brought into contact with the cavity mold 31 and the core mold 32, so that the temperature of the preform 11 is adjusted so as not to be equal to or lower than a temperature suitable for blow molding, and the uneven temperature that has been generated in the injection molding is also reduced. Note that the cavity mold 31 and the core mold correspond to the shape of the preform 11, and thus the shape of the preform is maintained in a desired shape also in the temperature adjusting step.

Figure 12A:
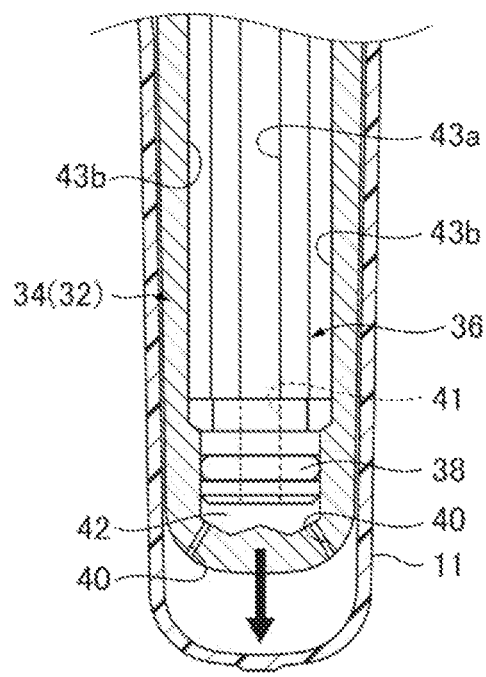
FIG. 12 is a diagram illustrating a flow of air when the core mold is inserted into the preform in the second embodiment.
Figure 12B:
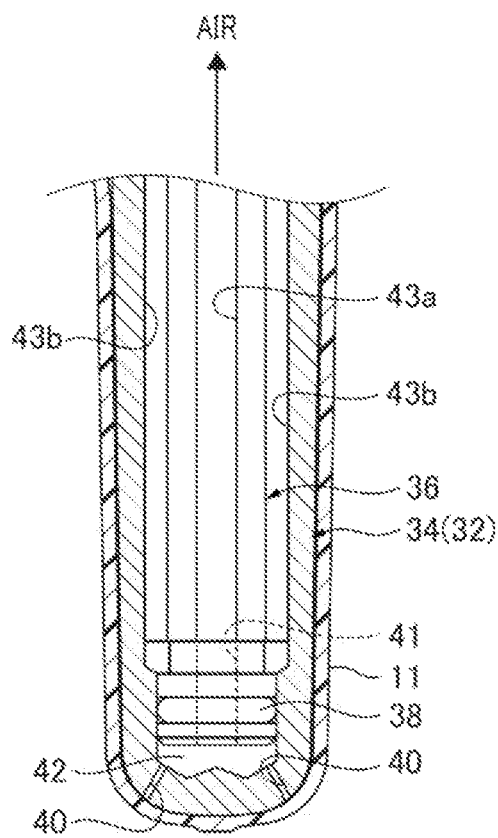

In addition, as illustrated in FIG. 12, when the core mold 32 is inserted into the preform 11, the air in the preform 11 is guided from the exhaust port 40 through the exhaust chamber 42 in the core pin to the exhaust path 41, and is then exhausted to the outside. Therefore, when the core mold 32 is inserted into the preform 11, for example, it is possible to suppress generation of air accumulation between the preform 11 and the core mold 32 on the bottom surface or the side surface of the preform. Accordingly, the contact area between the inner circumferential surface of the preform 11 and the core mold 32 is further increased, and thus it is possible to further improve the efficiency of additional cooling and uneven temperature adjustment of the preform 11, by using the core mold 32.

Note that the exhaust path 41 of the core mold 32 is disposed on the inner circumferential side of the flow paths 43a and 43b for the temperature adjustment medium. That is, the exhaust path 41 is not located between the preform 11 and the flow paths 43a and 43b for the temperature adjustment medium. Therefore, heat conduction between the temperature adjustment medium flowing through the core mold 32 and the preform 11 is not hindered by being insulated by the exhaust path 41.

As described heretofore, in the second embodiment, by cooling the preform 11 in the temperature adjusting step (S102), it is possible to favorably mold the container while shortening the molding cycle time in the same manner as the first embodiment.

In addition, in the second embodiment, the exhaust port 40, for discharging the air from the inside of the preform 11 through the exhaust path 41 in the core mold 32, is provided at a tip end portion of the core mold 32. Accordingly, when the core mold 32 is inserted into the preform 11, the air in the preform 11 can be discharged to the outside. The region where the contact between the core mold 32 and the preform 11 is prevented by the air is no longer present, and the contact area between the inner circumferential surface of the preform 11 and the core mold 32 is increased, and thus it is possible to further improve the efficiency of additional cooling and uneven temperature adjustment of the preform 11 in a high temperature state, by using the core mold 32. The above advantages are the same regardless of the shape of the preform 11. For example, even with the preform 11 having an elongated shape that is difficult to exhaust the air, it is possible to improve the efficiency of additional cooling and uneven temperature adjustment.

In particular, the molding cycle time is shortened, and so the time for the temperature adjusting process is also shortened, and it is necessary to further improve the efficiency of heat exchange between the core mold 32 and the preform 11. According to the present embodiment, the formations of the exhaust port 40 and the exhaust path 41 further improve the efficiency of the additional cooling and the uneven temperature adjustment of the preform 11 in a high temperature state, by using the core mold 32. Therefore, the temperature adjustment is enabled in a short time in the temperature adjusting step (S102). That is, shortening of the molding cycle is achieved without quality degradation of the container to be manufactured.

In addition, in the second embodiment, by selecting the flow path for the temperature adjustment medium to flow through in the uneven temperature adjusting step (S100), the temperature distribution of the core mold 32 is adjusted in the circumferential direction. Accordingly, the uneven temperature in the preform 11 in the circumferential direction is suppressed, and it is possible to favorably mold the container in the blow molding. In addition, the temperature distribution of the core mold 32 is optimized for the uneven temperature adjustment in the uneven temperature adjusting step (S100). This also enables the temperature adjustment in a short time in the temperature adjusting step (S102).

Third Embodiment

Figure 13:
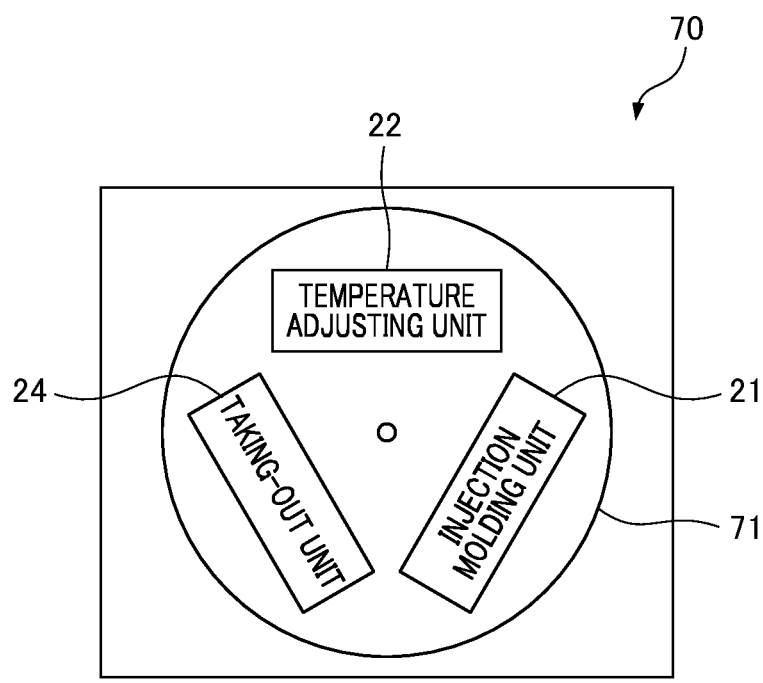
FIG. 13 is a diagram schematically illustrating a configuration of an injection molding apparatus in a third embodiment.

FIG. 13 is a view schematically illustrating a configuration of an injection molding apparatus 70 in a third embodiment. The injection molding apparatus 70 in the present embodiment is an apparatus used for manufacturing a preform 11 at a high speed, and corresponds to the blow molding apparatus 20 in the first embodiment or the second embodiment, from which the blow molding unit 23 is excluded. For this reason, in the third embodiment, the same reference numerals are given to the same configurations as those of the first embodiment or the second embodiment, and overlapping descriptions will be omitted.

The injection molding apparatus 70 includes an injection molding unit 21, a temperature adjusting unit (temperature adjusting unit for cooling the preform 11, a post-cooling unit) 22, a taking-out unit 24, and a rotating plate 71 as a conveyance mechanism. The injection molding apparatus 70 in the third embodiment includes a mold unit 30, which is the same as that in the first embodiment or the second embodiment, in the temperature adjusting unit 22.

The injection molding unit 21, the temperature adjusting unit 22, and the taking-out unit 24 are respectively disposed at positions rotated by a predetermined angle (for example, 120 degrees) in the circumferential direction of the rotating plate 71. The configuration of the rotating plate 71 is the same as that of the conveyance mechanism in the first embodiment, except that the rotation angle is different for every step.

In the injection molding apparatus 70 in the third embodiment, by the rotation of the rotating plate 71, the preform 11 with the neck portion 12 held by the neck mold 27 is conveyed to the injection molding unit 21, the temperature adjusting unit 22, and the taking-out unit 24 in this order.

In the injection molding apparatus 70 in the third embodiment, the temperature adjusting unit 22 including the mold unit 30 of FIG. 2 or FIG. 8 is provided on a downstream side of the injection molding unit 21, so that the temperature adjusting unit 22 can additionally cool the preform 11. The temperature adjusting unit 22 additionally cools the preform 11. Thus, in the injection molding unit 21, in the same manner as the first embodiment or the second embodiment ((A) of FIG. 7 in the present embodiment), the preform 11 can be released even in a high temperature state. Therefore, it is possible to significantly shorten the cooling time of the preform 11 in the injection molding unit 21. Accordingly, in the third embodiment, it is possible to start molding the next preform 11 early, and thus to shorten the molding cycle time of the preform 11.

Also in the third embodiment, advantages of the temperature adjusting unit 22 that have been described in the first embodiment or the second embodiment are obtainable in the same manner. Note that in the third embodiment, so that whitening (cloudiness), sink marks, or irregular deformation does not occur at room temperature after the taking-out unit 24 discharges the preform 11 to the outside of the apparatus, it is necessary for the temperature adjusting unit 22 to cool the preform until the preform 11 is completely solidified (it is necessary to cool the temperature of the preform 11 to a temperature equal to or lower than a temperature suitable for blow molding (for example, 50° C. or lower)). Therefore, the temperatures of the mold unit 30 and the cavity mold 31 are set to low temperatures by the temperature adjustment medium having a low temperature (for example, 0° C. to 20° C.)

The present invention is not limited to the above embodiments, and various improvements and design changes may be made without departing from the gist of the present invention.

In the uneven temperature adjusting step (S100) in the first embodiment or the second embodiment, the description has been given with regard to the example in which the unevenness in the temperature distribution of the preform 11 or the unevenness in the thickness distribution of the container is adjusted to decrease in the circumferential direction. However, for example, in a case of manufacturing an eccentric container in which the central axis of the neck portion is not coaxial with the body portion or a container with a handle, an adjustment may be made in the uneven temperature adjusting step (S100) such that unevenness of the temperature distribution of the preform 11 or the thickness distribution of the container occurs at a predetermined position in the circumferential direction with a desired size.

Further, in the second embodiment, when the flow path for the temperature adjustment medium to flow through is adjusted, a given flow path does not have to be completely blocked. For example, the flow rate of the temperature adjustment medium in a given flow path may be narrowed to adjust the temperature distribution of the core mold 32 in the circumferential direction. Further, the means for adjusting the flow path is not limited to the fitting of the stopper 60, and may be achieved by another mechanism such as opening and closing of a valve.

In addition, the embodiments disclosed herein are to be considered in all respects as illustrative and non-limiting ones. The scope of the present invention is indicated not by the above description but by the scope of claims, and it is intended that meanings equivalent to the claims and all modifications within the scope are included.

The invention claimed is:

1. A mold unit for cooling a preform that has been injection-molded, the preform having a bottomed shape and made of a resin, the mold unit comprising
a core mold having an outer shape corresponding to an inner shape of the preform, and being insertable into the preform, wherein
an exhaust port is disposed at a tip end portion of the core mold facing a bottom portion of the preform, the exhaust port being configured to discharge air from an inside of the preform through an inside of the core mold,
a plurality of flow paths for a temperature adjustment medium extending in an axial direction of the core mold are formed inside the core mold, and
the flow paths for the temperature adjustment medium are arranged in parallel with each other along a circumferential direction of the core mold.

2. The mold unit according to claim 1, wherein
the exhaust port is formed in a shape to be rotationally symmetric in the circumferential direction of the core mold.

3. The mold unit according to claim 1, wherein
the flow paths for the temperature adjustment medium are formed on an outer circumferential side of an exhaust path connected with the exhaust port.

4. The mold unit according to claim 1, further comprising a cavity mold configured to accommodate the preform.

5. A blow molding apparatus comprising:
an injection molding unit configured to injection-mold a preform having a bottomed shape and made of a resin;
a temperature adjusting unit including
a mold unit for cooling a preform that has been injection-molded, the mold unit comprising
a core mold having an outer shape corresponding to an inner shape of the preform, and being insertable into the preform, wherein
a flow path for a temperature adjustment medium extending in an axial direction of the core mold is formed inside the core mold,
the flow path is formed at a position displaced in a circumferential direction of the core mold, and
a position of the flow path is adjustable in the circumferential direction;
and configured to adjust a temperature of the preform that has been manufactured by the injection molding unit; and
a blow molding unit configured to blow-mold the preform, the temperature of which has been adjusted, to manufacture a container made of the resin.

6. A blow molding method comprising:
injection-molding a preform having a bottomed shape and made of a resin;
adjusting a temperature of the preform that has been manufactured in the injection molding using a mold unit comprising
a core mold having an outer shape corresponding to an inner shape of the preform, and being insertable into the preform, wherein
a flow path for a temperature adjustment medium extending in an axial direction of the core mold is formed inside the core mold,
the flow path is formed at a position displaced in a circumferential direction of the core mold, and
a position of the flow path is adjustable in the circumferential direction; and
blow-molding the preform, the temperature of which has been adjusted, to manufacture a container made of the resin, wherein
in the injection molding, after injection of the resin material completes, a time for cooling a resin material in a mold space is equal to or less than ½ a time for injecting the resin material into the mold space.

7. A blow molding apparatus comprising:
an injection molding unit configured to injection-mold a preform having a bottomed shape and made of a resin;

a temperature adjusting unit including the mold unit of claim 1, and configured to adjust a temperature of the preform that has been manufactured by the injection molding unit; and a blow molding unit configured to blow-mold the preform, the temperature of which has been adjusted, to manufacture a container made of the resin.

8. A blow molding method comprising:

injection-molding a preform having a bottomed shape and made of a resin;

adjusting a temperature of the preform that has been manufactured in the injection molding, using the mold unit of claim 1; and blow-molding the preform, the temperature of which has been adjusted, to manufacture a container made of the resin.

* * * * *